(12) United States Patent
Dede et al.

(10) Patent No.: US 8,120,757 B2
(45) Date of Patent: Feb. 21, 2012

(54) REMOTE LENS UNIT ASSEMBLY FOR LASER DOPPLER VELOCIMETER

(75) Inventors: Edgar K. Dede, Manassas, VA (US);
Kenneth W. Simpson, Culpeper, VA (US)

(73) Assignee: Catch the Wind, Inc., Chantilly, VA (US)

( * ) Notice: Subject to any disclaimer, the term of this patent is extended or adjusted under 35 U.S.C. 154(b) by 67 days.

(21) Appl. No.: 12/723,333

(22) Filed: Mar. 12, 2010

(65) Prior Publication Data

US 2011/0188113 A1 Aug. 4, 2011

(51) Int. Cl.
*G01P 3/36* (2006.01)
(52) U.S. Cl. .......................................... 356/28
(58) Field of Classification Search ............ 356/28
See application file for complete search history.

(56) References Cited

U.S. PATENT DOCUMENTS

| 6,036,324 A * | 3/2000 | Bernacki et al. ............. 359/859 |
| 7,032,533 B2 * | 4/2006 | Weind ............................ 114/361 |
| 2003/0151732 A1 * | 8/2003 | Rogers et al. ................ 356/28.5 |
| 2005/0152035 A1 * | 7/2005 | Krausse ........................ 359/512 |

FOREIGN PATENT DOCUMENTS

WO    WO 2009/134221 A1    11/2009

* cited by examiner

*Primary Examiner* — Alessandro Amari
(74) *Attorney, Agent, or Firm* — Knobbe, Martens, Olson & Bear, LLP

(57) ABSTRACT

An assembly structure and method for housing a remote lens unit assembly of a laser Doppler velocimeter. The housing includes one or more transceiver telescopes and an optical window. The transceiver telescopes are aligned such that optical beams from the mounted optical transceiver telescopes cross paths at the optical window. The housing is mountable on a wind turbine.

20 Claims, 9 Drawing Sheets

US 8,120,757 B2

REMOTE LENS UNIT ASSEMBLY FOR LASER DOPPLER VELOCIMETER

BACKGROUND

The disclosure relates to a structure housing components of a laser Doppler velocimeter and in particular to a structure housing the telescopic elements of a laser Doppler velocimeter.

A laser Doppler velocimeter ("LDV") transmits light to a target region (e.g., into the atmosphere) and receives a portion of that light after it has scattered or reflected from the target region or scatterers in the target region. Using the received portion of scattered or reflected light, the LDV determines the velocity of the target relative to the LDV. Actual or non-relative velocity may also be determined. LDVs are extremely useful and have a wide range of applications including, but not limited to: blood-flow measurements, speed-limit enforcement, spaceship navigation, projectile tracking, and air-speed measurement. In the latter case the target consists of aerosols (resulting in Mie scattering), or the air molecules themselves (resulting in Rayleigh scattering).

An air speed LDV includes a source of coherent light, a beam shaper and one or more telescopes. The telescopes each project a generated beam of light into a target region. The beams strike airborne scatterers (or air molecules) in the target region, resulting in one or more back-reflected or back-scattered beams. In a monostatic configuration, a portion of the backscattered beams is collected by the same telescopes which transmitted the beams. The received beams are combined with reference beams in order to detect a Doppler frequency shift from which velocity may be determined.

An LDV, as disclosed in International Application Publication No. WO/2009/134221 ("the '221 publication"), the entirety of which is hereby incorporated by reference, may include at least three transceiver telescopes that are remotely located from the LDV coherent light source. As disclosed in an embodiment of the '221 publication, the disclosed LDV includes an active lasing medium, such as e.g., an erbium-doped glass fiber amplifier for generating and amplifying, a beam of coherent optical energy and a remote optical system coupled to the beam for directing the beam a predetermined distance to a scatterer of radiant energy. The remote optical system includes "n" duplicate transceivers (where n is an integer that may be, for example, three) for simultaneously measuring n components of velocity along n noncolinear axes. As disclosed in the '221 application, the optical fiber is used to both generate and wave guide the to-be-transmitted laser beam. A seed laser from the source is amplified and, if desired, pulsed and frequency offset, and then split into n source beams. The n source beams are each delivered to an amplifier assembly that is located within the n transceiver modules, where each of the n transceiver modules also includes a telescope. Amplification of the n source beams occurs at the transceiver modules, just before the n beams are transmitted through the telescope lens to one or more target regions. When the n source beams are conveyed through connecting fibers from the laser source to each of the n telescopes within the respective transceiver modules, the power of each of the n source beams is low enough so as not to introduce non-linear behaviors from the optical fibers. Instead, power amplification occurs in the transceiver module, just before transmission from the telescope. Consequently, fiber non-linear effects are not introduced into the system.

By using the LDV disclosed in the '221 application, object or wind velocities may be measured with a high degree of accuracy. Because the source laser is split into n beams, the measurements taken along all of the n axes are simultaneous. Additionally, splitting the source beam into n beams does not necessarily require that the source laser transmit a laser with n times the necessary transmit power, because each of the n beams are subsequently power amplified before transmission. Additionally, the disclosed LDV has no moving parts, and is thus of reduced size and improved durability. The disclosed LDV may be used with a platform motion sensing device such as e.g., an inertial measurement unit ("IMU") or global positioning satellite ("GPS") unit so that the motion of the LDV platform may be compensated during calculation of the measured velocities. Thus, because of the light-weight and non-bulky nature of the LDV, and because of the LDV's ability to compensate for platform motion, the disclosed LDV may be mounted on any moving platform (e.g., a helicopter, a boat, etc.) and still obtain highly accurate readings.

As mentioned above, the transceiver telescopes, as well as their respective amplifier assemblies, may be located remotely from the LDV light source and other components. The remotely located transceiver assemblies may be positioned in a variety of locations not necessarily suitable for mounting an entire LDV, such as, for example, on the nacelle or hub of a wind turbine. Mounting the transceiver assemblies remotely from the remainder of the LDV can subject the transceiver assemblies to harsher environmental conditions than that of the remainder of the LDV. What is needed is a durable housing that protects the components from environmental conditions including temperature fluctuations and moisture. The desired housing must be able to house one or more telescope transceivers in an environmentally protected manner. The housing may also enclose additional components of the LDV, such as one or more amplifiers. In an embodiment wherein the entire LDV is enclosed within the housing, the housing must be capable of encasing a source laser for the transceiver telescopes.

What is needed, then, is an environmentally-protective structure to house the remote lens assembly of an LDV, or alternatively, the entire LDV.

DETAILED DESCRIPTION

Figure 1:
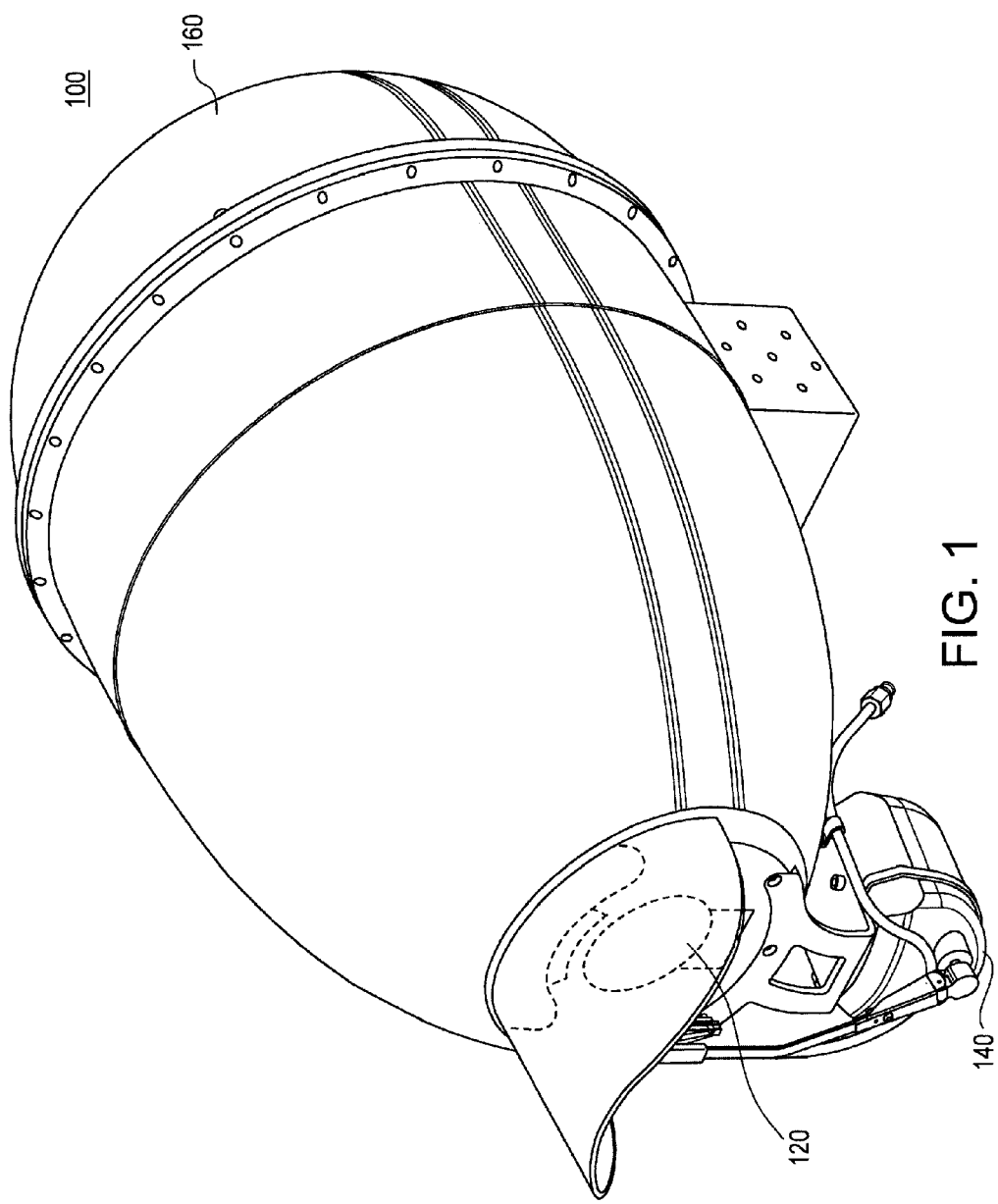
FIG. 1 illustrates a remote lens unit assembly in accordance with embodiments of the disclosed invention.

In order to solve the problems described above in connection with protecting the sensitive components of the remote transceiver assembly, the remote lens unit assembly of the LDV or, alternatively, the entire LDV disclosed in the '221 application, may be housed in a structure as illustrated, for example, in FIG. 1. FIG. 1 illustrates a remote lens unit ("RLU") assembly 100 that includes, for example, an optical window 120 through which laser transmission and reception is achieved, a wiper motor assembly 140 and a housing 160 for up to three individual light detection and ranging ("LIDAR") transceiver telescope assemblies. In an embodiment of the disclosure, the remote lens unit ("RLU") assembly 100 is egg-shaped. However, other shapes may be used, as understood by a person of ordinary skill in the art.

Figure 2:
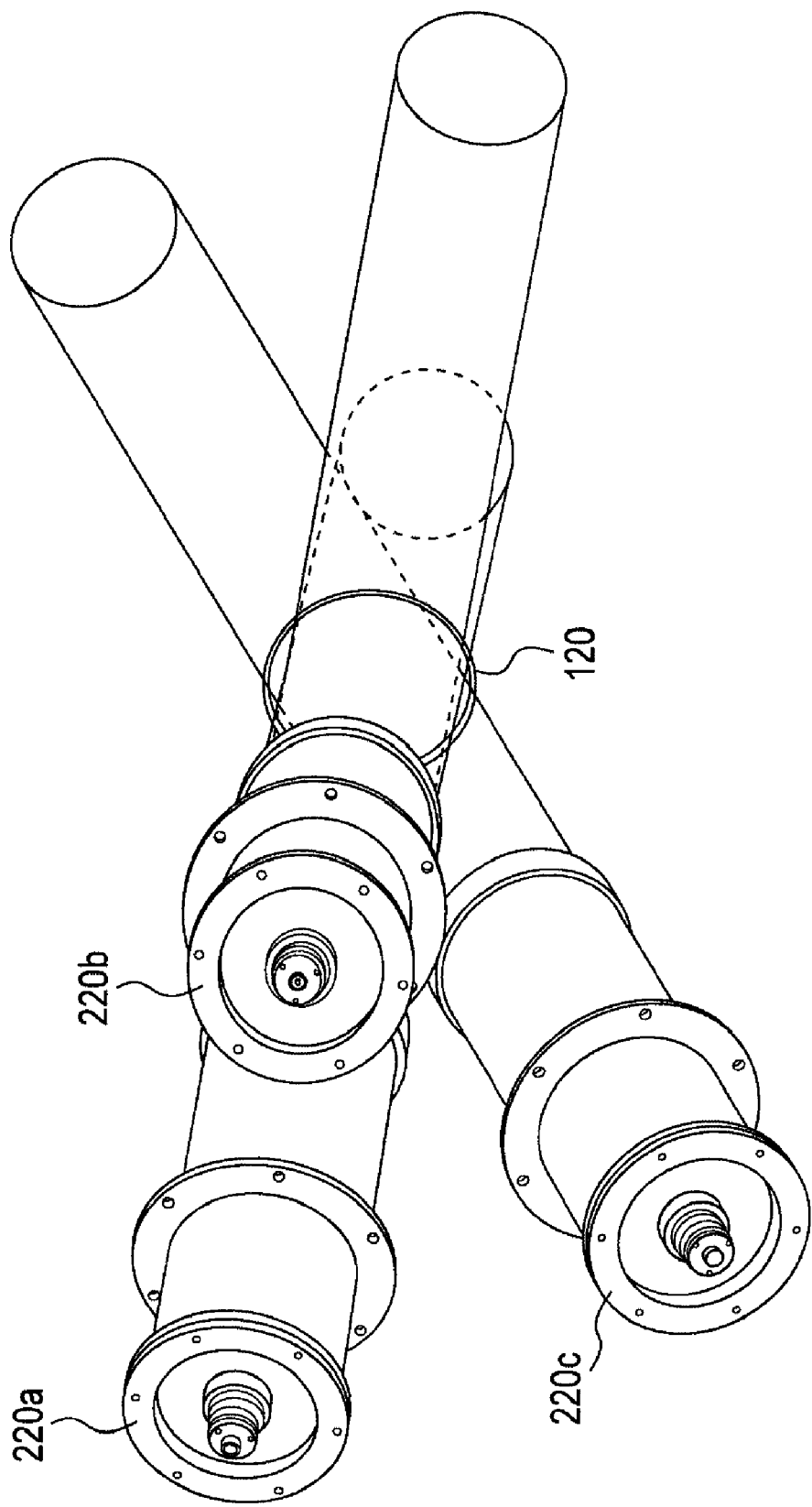
FIG. 2 illustrates a transceiver telescope assembly in accordance with embodiments of the disclosed invention.

The RLU assembly 100 includes a single optical window 120. The optical window 120 is used by each of the transceiver telescope assemblies within the structure. By angling the transceiver telescope assemblies so that the output lasers each cross paths at the position of the optical window 120, the diameter of the optical window 120 is reduced to the approximate diameter of a single output laser from one of the transceiver telescope assemblies. For example, FIG. 2 illustrates how three transceiver telescope assemblies 220a, 220b, 220c can be angled so that the respective beam paths each cross at a single plane. The plane at which the beams cross is where the optical window 120 is positioned. By minimizing the size of the optical window 120 and by limiting the number of optical windows to one, maintenance concerns for the structure are greatly reduced and simplified. A small, single optical window 120 means that only a small surface area needs to be maintained as clean for the transceiver beams. A single window 120 also reduces the potential for moisture ingress and other environmental effects on the components within the RLU assembly 100.

Figure 3:
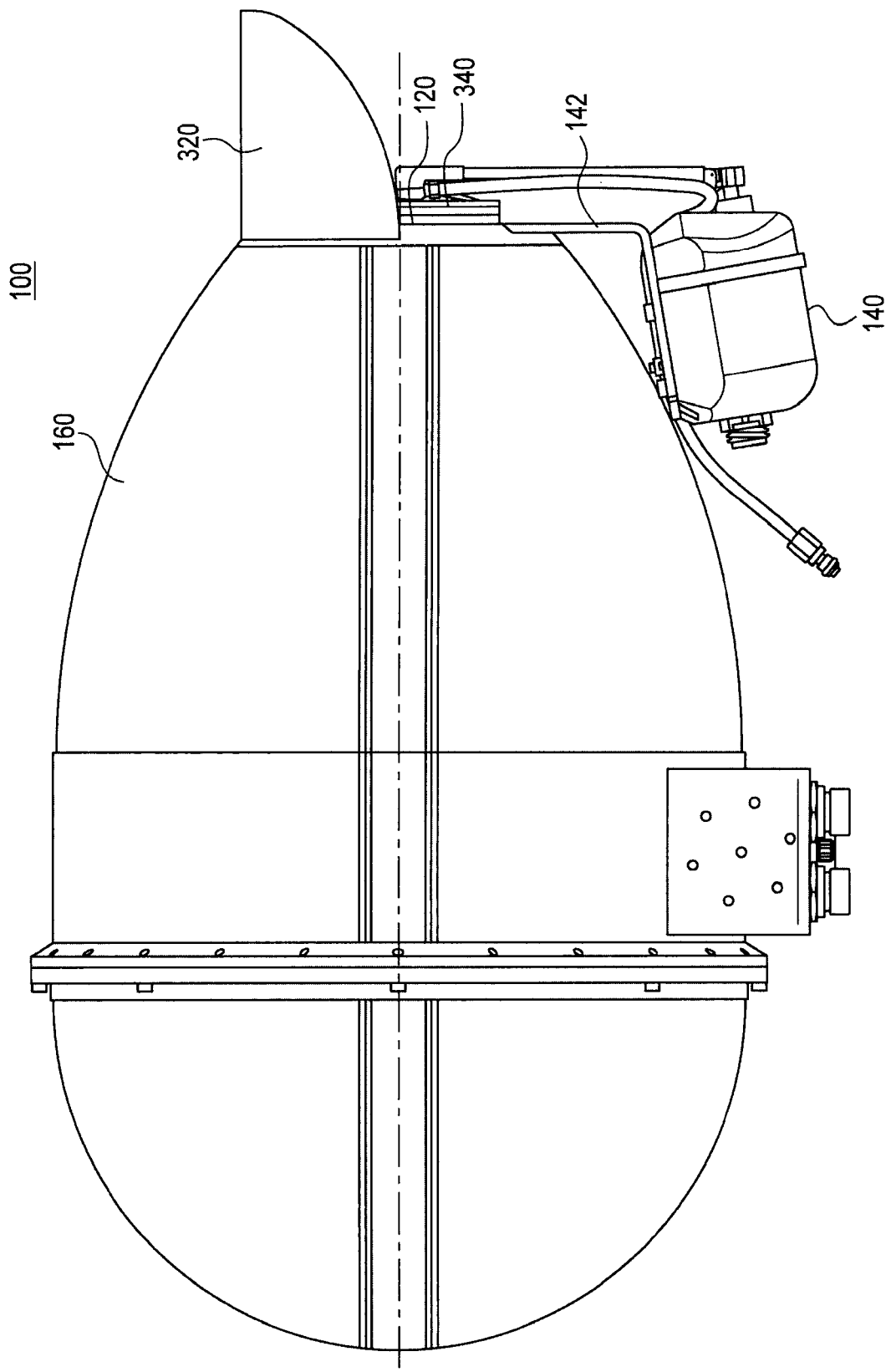
FIG. 3 illustrates a side view of the remote lens unit assembly in accordance with embodiments of the disclosed invention.
Figure 4:
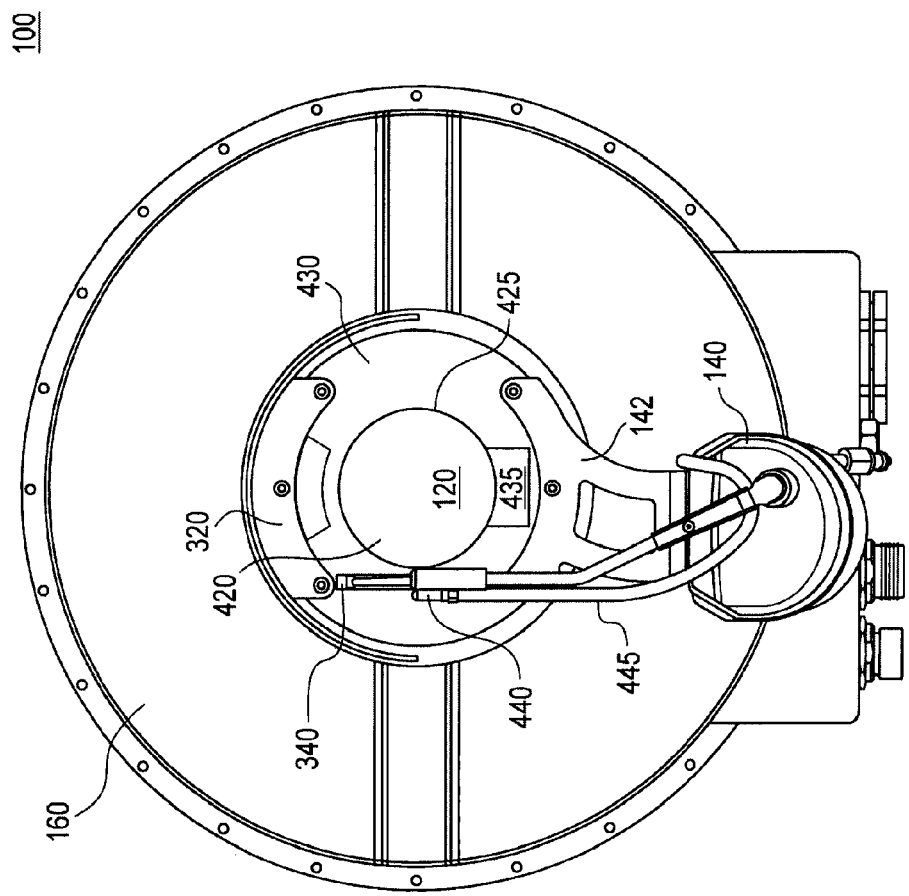
FIG. 4 illustrates a front view of the remote lens unit assembly in accordance with embodiments of the disclosed invention.

The single optical window 120 is protected by a visor 320 mounted above the window 120, as illustrated in FIG. 3, which shows a side view of the RLU assembly 100. The single window 120 needs only one wiper motor assembly 140. The single wiper motor assembly 140 is mounted via mounting bracket 142 onto, or within, the RLU assembly 100 so that a wiper blade 340 can wipe moisture away from the optical window 120 as needed. As illustrated in FIG. 4, which shows a front view of the RLU assembly 100, the wiper blade 340 is of sufficient size to clean at least the portion of the optical window 120 that covers an aperture 420 in the housing 160 that allows the telescope beams to pass into and out of the RLU assembly 100. Adjacent to the wiper blade 340 is a washer fluid nozzle 440 for dispensing washer fluid to the optical window 120 when the wiper motor assembly 140 is in operation. The washer fluid is supplied to the washer fluid nozzle 440 via a washer fluid supply tube 445. Although not illustrated here, other known moisture-removing devices may also be used to remove moisture from the window 120.

In connection with an exemplary embodiment, the optical window 120 is formed of silicon. A silicon window allows for transmission of the laser beams at the expected operational wavelengths for LIDAR operation. A silicon window also has a high thermal conductivity relative to other optical materials. This promotes the inclusion of simple heaters to heat or defrost the silicon window 120. For example, the optical window 120 includes a rod heater 425 affixed to or near the window 120 to heat the window 120 so as to avoid ice buildup on the window 120. The temperature of the rod heater 425 is controlled using an independent thermostat 435. The window 120 is supported by a window mount 430 that includes a mount for the window 120, the rod heater 425 and the window thermostat 435. The window mount 430 is thermally isolated from the remainder of the RLU assembly 100 so that heat from the rod heater 425 is localized to the window 120 and has minimal effect on the assembly's optical components. The mount 430 is adjustable so that the window surface can be made to be flush with the external surface of the RLU assembly 100. A seal fitting the window 120 to the window mount 430 prevents moisture and other contaminants from entering the RLU assembly 100 through the window mount 430.

Figure 5:
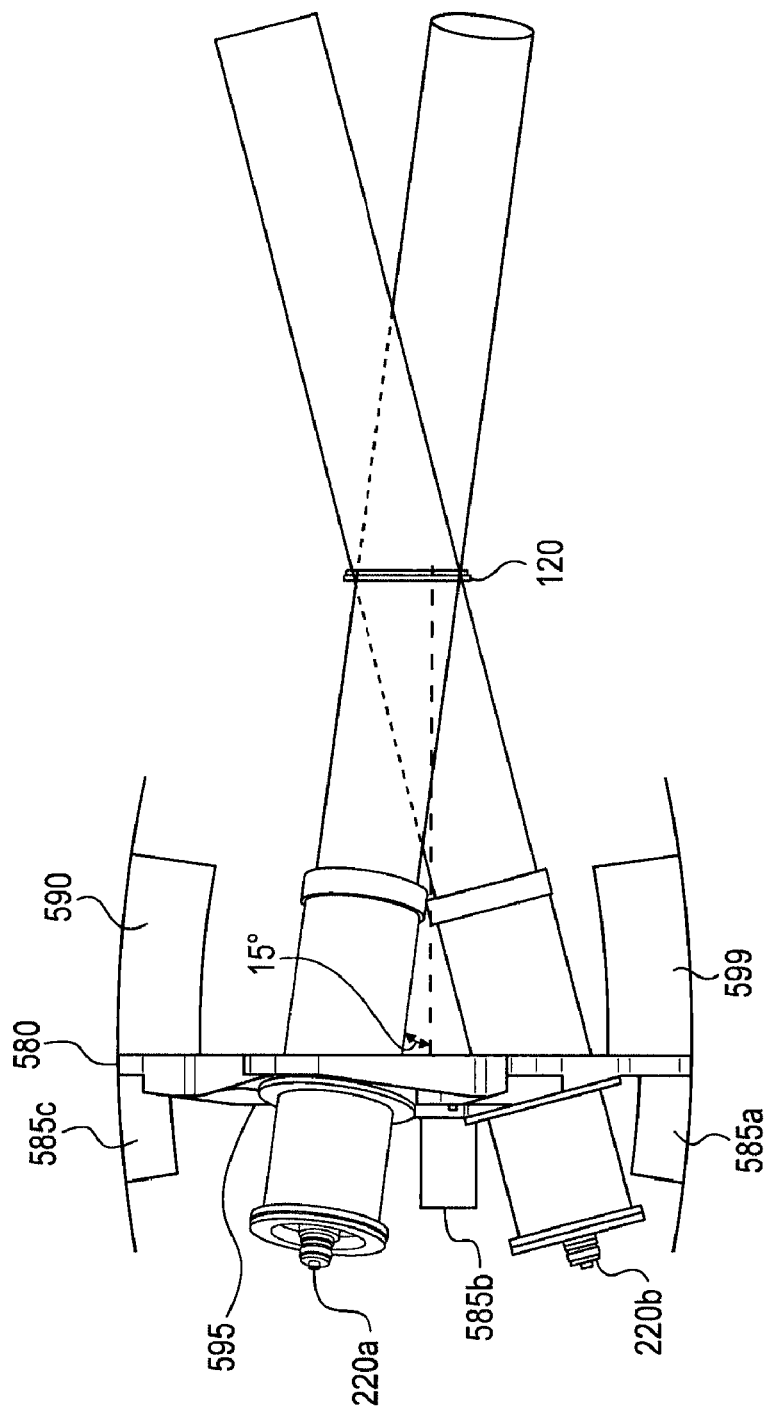
FIG. 5 illustrates a mounting frame for a transceiver telescope assembly in accordance with embodiments of the disclosed invention.
Figure 6:
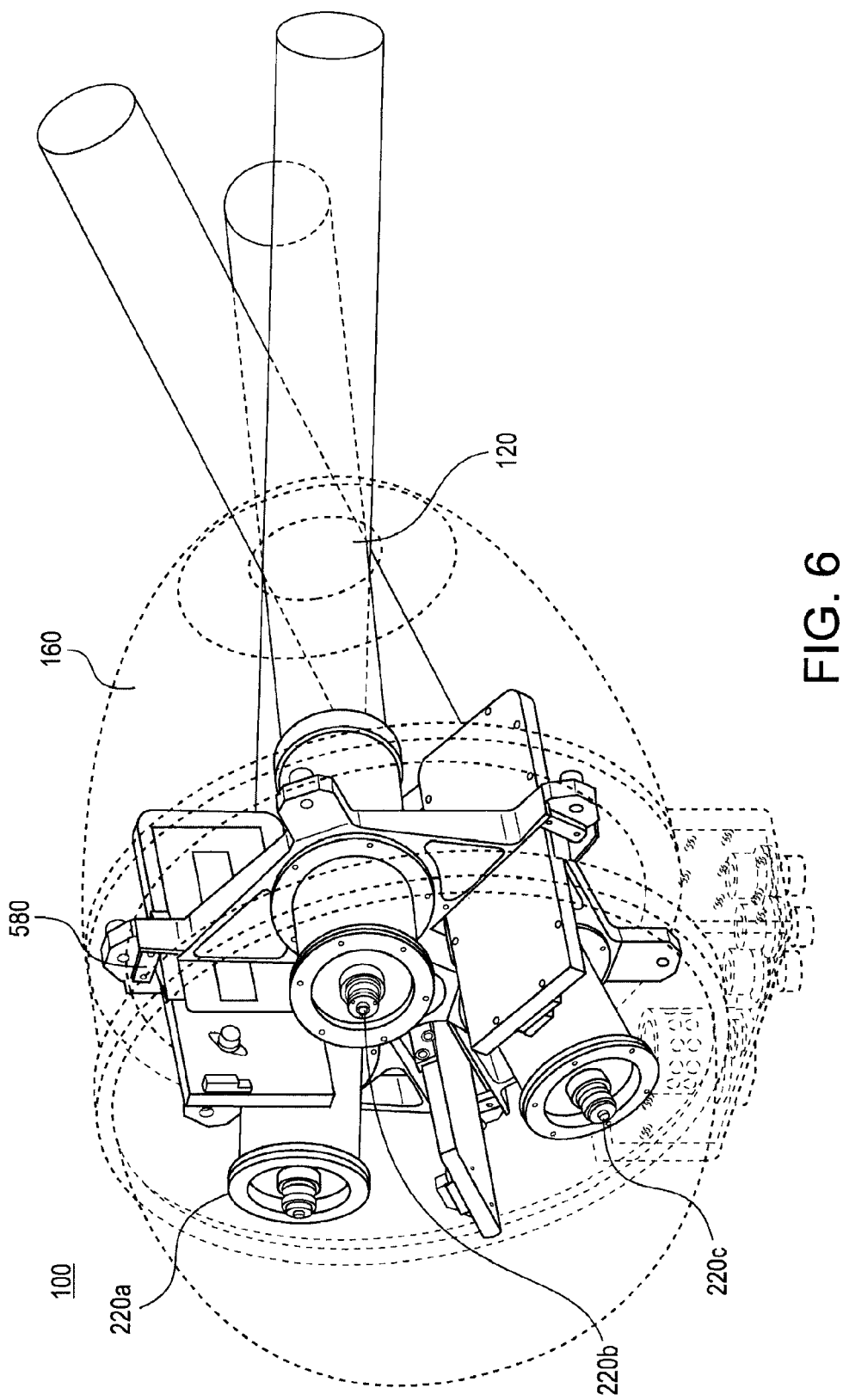
FIG. 6 illustrates the remote lens unit assembly and mounting frame in accordance with embodiments of the disclosed invention.

Inside the RLU assembly 100 is a rigid internal mounting frame 580 to accurately position each telescope assembly 220a, 220b, 220c (collectively, 220) with respect to each other, as is illustrated in FIGS. 5 and 6. In FIG. 5, only two telescope assemblies 220a, 220b are illustrated, while the third telescope assembly 220c is positioned behind one of the other visible telescope assemblies 220a, 220b. As shown in FIGS. 5 and 6, the mounting frame 580 may be located near the rear of the housing 160 for mounting up to three telescope assemblies 220. In one embodiment, the telescope assemblies 220 are mounted equidistant from each other. In the case of three telescope assemblies 220, the assemblies 220 are mounted on the mounting frame 580 at 120-degree intervals. Variations in this spacing of the telescope assemblies 220 may also be used. The mounting frame 580 also establishes the orientation of the telescope assemblies 220. In an exemplary embodiment, as shown in FIG. 5, the telescope assemblies 220 are each oriented along the surface of a cone whose apex is at the silicon window 120. As an example, the cone may be a 15-degree half angle cone, meaning that the telescope assemblies 220 are each positioned at a 15 degree angle from the longitudinal axis of the RLU assembly 100. Variations in the orientation angle may also be made, according to the size of the RLU assembly 100 and the dimensions of the space to be measured by the LDV.

In addition to the telescope assemblies 220, the mounting frame 580 is able to mount up to three power amplifier sub-assemblies 585a, 585b, 585c for corresponding telescope assemblies 220. The mounting frame 580 may also be used to mount an altitude and heading reference system ("AHRS") 590. The AHRS 590 is used to determine the orientation of the RLU assembly 100 itself. The optical components are mounted to the mounting frame 580 using ceramic bushings 595 in order to thermally isolate the optical components from the rest of the structure. The mounting frame 580 also includes heaters 599 operating from minimal heating power in order to maintain an operating temperature for the optical system.

Figure 7:
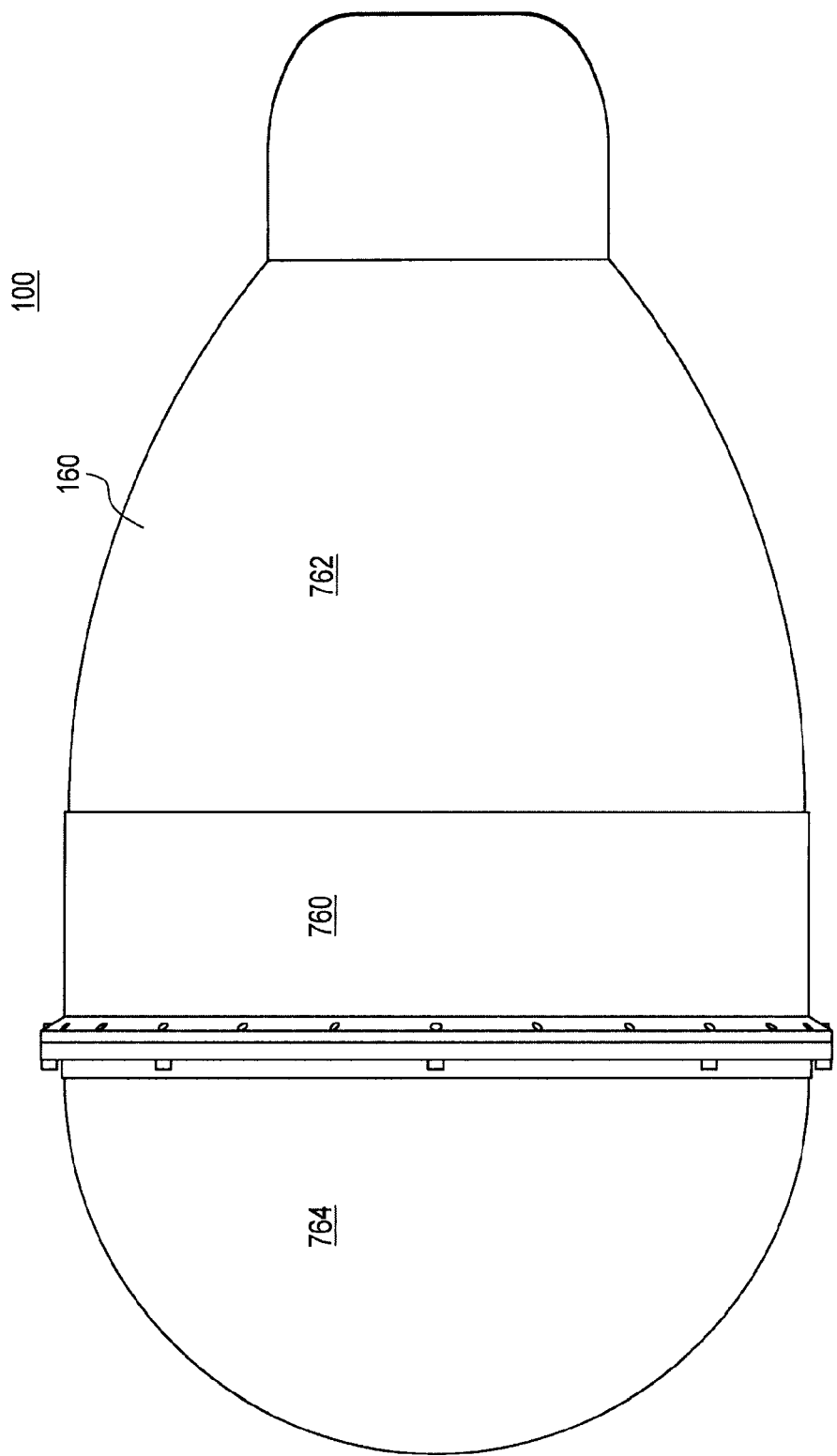
FIG. 7 illustrates a top view of the remote lens unit assembly in accordance with embodiments of the disclosed invention.
Figure 8:
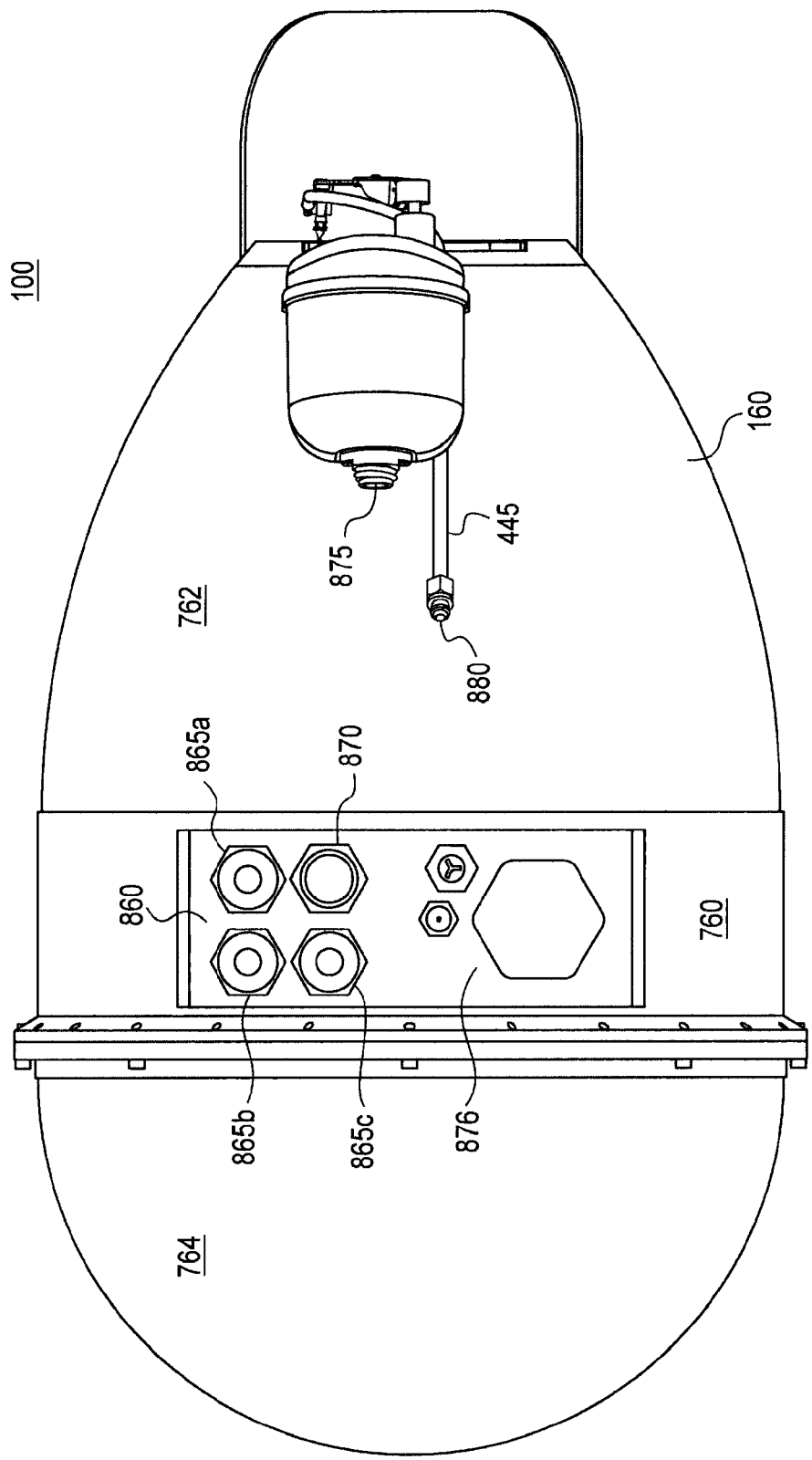
FIG. 8 illustrates a bottom view of the remote lens unit assembly in accordance with embodiments of the disclosed invention.

FIGS. 7 and 8 respectively illustrate top and bottom views of the RLU assembly 100. In FIG. 7, the housing 160 includes covers 760, 762, 764. Covers 762 and 764 are formed, for example, as spun aluminum covers which form a complete 360° shell for the front and back of the RLU assembly 100. Cover 760 is a cylindrical cover that fits between covers 762, 764. Cover 760 may also be formed of aluminum, for example. The resulting covers 760, 762, 764 are cost effective and strong with a minimal amount of joints. The main covers 760, 762, 764, and other components of the RLU assembly 100 may be joined together via brazing or welding or using other methods known in the art. The housing 160 provides a hermetic shell that limits humidity ingress to the interior of the RLU assembly 100. In addition, the RLU assembly 100 includes a serviceable desiccant for absorbing excess moisture within the RLU assembly 100. Sealants are used at joints and openings to reduce the amount of moisture that enters the RLU assembly 100.

Referring to FIG. 8, the housing 160 also includes a center body 860 that includes cable egress and mounting features. In order to provide power and control to the components within the interior of the RLU assembly 100, the center body 860 includes connectors for fiber optic and electrical inputs. Fiber optic connectors 865a, 865b, 865c are included for each respective telescope assembly 220. As explained in the '221 application, the RLU assembly 100 may be separate and remote from a laser source and other components of the LDV. In such a case, the RLU assembly 100 is coupled to the laser source and other components via fiber optic cables connected to the RLU assembly 100 through fiber optic connectors 865a, 865b, 865c. Alternatively, the RLU assembly 100 may be made to include additional LDV components such as a laser source.

An electrical and control signal connector 870 is used to provide electricity and control to the AHRS 590 and heaters 599 in the assembly (including the rod heater 425). The electrical and control signal connector 870 could be used to control the wiper motor assembly 140 as well. Alternatively, a separate wiper control connector 875 may be used. A wiper fluid connection 880 is provided to the wiper motor assembly 140 and the washer fluid tube 445. Other connectors 876 may be included on the center body 860 for mounting the RLU assembly 100 to a structure, such as to a wind turbine.

Figure 9:
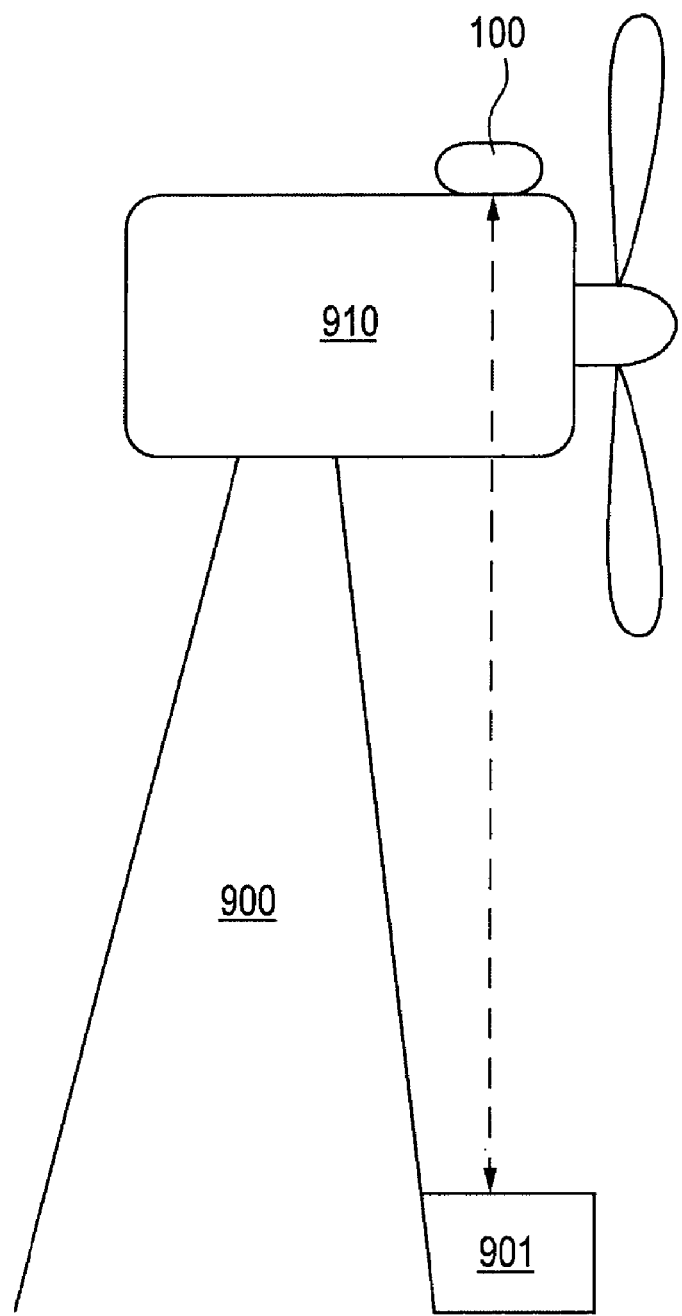
FIG. 9 illustrates a remote lens unit assembly mounted on a wind turbine in accordance with embodiments of the disclosed invention.

FIG. 9 illustrates the RLU assembly 100 mounted on the nacelle 910 of a wind turbine 900 in order to measure wind velocity, as described in the '221 application. Alternatively, the RLU assembly 100 may be mounted at other locations on or near the wind turbine 900. The RLU assembly 100 is communicatively coupled to a laser source and other LDV components 901, located, for example, at the base of the wind turbine 900. The advantages of the RLU assembly 100 enable the assembly with all of its included components to be mounted in exposed and difficult-to-access locations, such as on the wind turbine 900, while other components 901 of the LDV (e.g., laser source, etc.) may be located elsewhere and out of the elements. Other mounting locations include helicopters and other aircraft, towers, buildings and other moving vehicles such as boats, etc.

The above description and drawings should only be considered illustrative of embodiments that achieve the features and advantages described herein. Modification and substitutions to specific structures can be made. Accordingly, the claimed invention is not to be considered as being limited by the foregoing description and drawings.

The invention claimed is:

1. A structure, comprising:
   a housing;
   one or more transceiver telescopes mounted in the housing; and
   an optical window in the housing configured to allow optical beams from each of the one or more transceiver telescopes to cross paths as the beams pass through the optical window.

2. The structure of claim 1, wherein a width of the optical window is approximately equal to a width of the optical beams.

3. The structure of claim 1, further comprising fiber optic connectors coupled to the one or more transceiver telescopes mounted in the housing and coupled to one or more light sources separate and remote from the housing.

4. The structure of claim 1, further comprising a wiper motor coupled to the Lousing and configured to move a wiper blade across the optical window.

5. The structure of claim 1, further comprising:
   a first heater located inside the housing and configured to maintain the one or more transceiver telescopes at a predetermined temperature; and
   a second heater configured to prevent ice buildup on the optical window.

6. The structure of claim 1, further comprising an altitude and heading determining system within the housing.

7. The structure of claim 1, further comprising an amplifier located in the housing coupled to the one or more transceiver telescopes and configured to amplify one or more source laser beams just before a transmission from the one or more transceiver telescopes.

8. The structure of claim 1, further comprising mounts configured to support respective ones of the one or more transceiver telescopes.

9. The structure of claim 8, wherein the mounts are equidistant from each other.

10. The structure of claim 1, wherein the one or more transceiver telescopes are oriented around a 15-degree half angle cone positioned with an apex of the cone at the optical window and a major axis of the cone along a longitudinal axis of the structure.

11. A wind turbine assembly, comprising:
    a wind turbine;
    a housing;
    one or more transceiver telescopes located in the housing; and
    an optical window in the housing configured to allow optical beams from each of the one or more transceiver telescopes to cross paths as the beams pass through the optical window.

12. The assembly of claim 11, wherein a width of the optical window is approximately equal to a width of the optical beams.

13. The assembly of claim 11, further comprising fiber optic connectors coupled to the one or more transceiver telescopes and coupled to one or more light sources located separate and remote from the housing.

14. The assembly of claim 11, further comprising a wiper motor assembly configured to move a wiper blade across the optical window.

15. The assembly of claim 11, wherein the one or more transceiver telescopes are mounted equidistant from each other.

16. The assembly of claim 11, wherein the one or more transceiver telescopes are each oriented around a 15-degree half angle cone positioned with an apex of the cone at the optical window and a major axis of the cone along a longitudinal axis of the housing.

17. The assembly of claim 11, wherein a light source is located at a base of the wind turbine.

18. The assembly of claim 11, wherein the housing is coupled to a nacelle of the wind turbine.

19. A remote lens unit assembly, comprising:
    a housing;
    a transceiver telescope located in the housing; and
    an optical window located in the housing and configured so optical beams from the transceiver telescope cross paths as the beams pass through the optical window.

20. The remote lens unit assembly of claim 19, wherein the remote lens unit assembly is coupled to a building, a tower, an aircraft, or other moving vehicle.

* * * * *